United States Patent [19]
Ueno et al.

[11] Patent Number: 5,206,917
[45] Date of Patent: Apr. 27, 1993

[54] METHOD FOR COLLATING INDEPENDENT FIGURE ELEMENTS BETWEEN IMAGES

[75] Inventors: Hiroshi Ueno; Hisami Nishi, both of Doshomachi, Japan

[73] Assignee: Nippon Sheet Glass Co., Ltd., Osaka, Japan

[21] Appl. No.: 683,557

[22] Filed: Apr. 10, 1991

[30] Foreign Application Priority Data

Apr. 19, 1990 [JP] Japan .................................. 2-103760

[51] Int. Cl.⁵ ............................................. G06K 9/36
[52] U.S. Cl. ........................................ 382/44; 382/45; 382/46
[58] Field of Search ............... 382/44, 45, 46, 8, 34, 382/5, 6

[56] References Cited

U.S. PATENT DOCUMENTS

| | | | |
|---|---|---|---|
| 4,124,797 | 11/1978 | Himmel | 382/46 |
| 4,672,676 | 6/1987 | Linger | 382/45 |
| 4,680,627 | 7/1987 | Sase et al. | 382/8 |
| 4,803,735 | 2/1989 | Nishida et al. | 382/45 |
| 4,876,732 | 10/1989 | Miyagawa et al. | 382/46 |
| 4,962,423 | 10/1990 | Yamada et al. | 382/8 |
| 5,018,213 | 5/1991 | Sikes | 382/8 |
| 5,073,950 | 12/1991 | Colbert et al. | 382/46 |

*Primary Examiner*—Leo H. Boudreau
*Assistant Examiner*—David Fox
*Attorney, Agent, or Firm*—Woodcock Washburn Kurtz Mackiewicz & Norris

[57] ABSTRACT

A method for collating independent figure elements in an object image with a reference image both including independent elements which are not interlinked with each other. The method comprises steps of defining a relative coordinate system in an image plane for the reference image and the object image on the basis of centers of gravity of two distinctive independent elements which are identified with values indicative of features of the elements; and collating pairs of independent elements between the reference image and the object image on the basis of the relative coordinate system.

18 Claims, 5 Drawing Sheets

FIG. 4
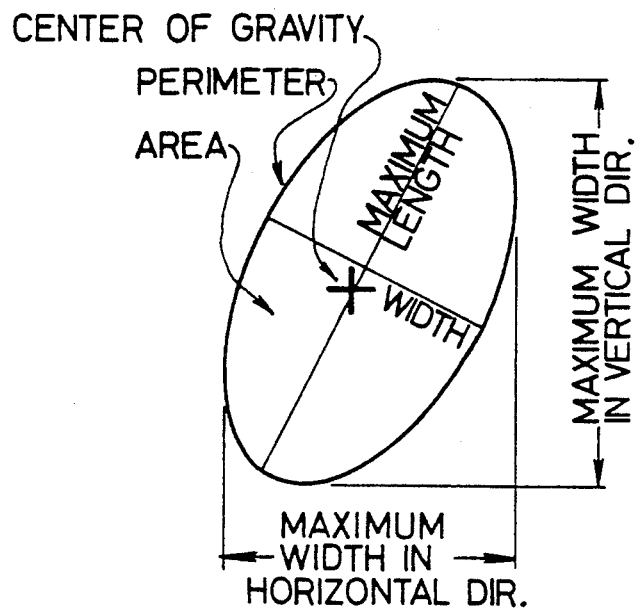
FIG. 5
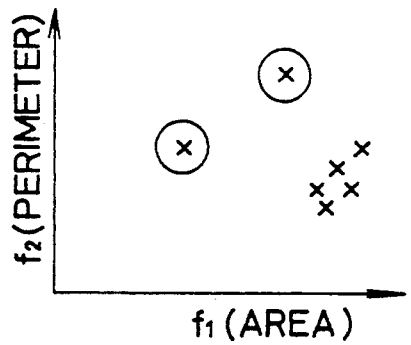
FIG. 6
BASE POINT $(x_M, y_M)$
| No | x | y | DISTANCE |
|----|------|------|----------|
| 1  | $x_1$ | $y_1$ | $d_1$ |
| 2  | $x_2$ | $y_2$ | $d_2$ |
|    |      |      |          |
|    |      |      |          |
| N  | $x_N$ | $y_N$ | $d_N$ |
$d_i = \sqrt{(x_i - x_M)^2 + (y_i - y_M)^2}$
$d_{min} = \min(d_1, d_2, \cdots d_N)$ $2r = \min(d1, d2, d3, d4, d5, \cdots)$

| INDEPENDENT PATTERN | P1 | P2 | P3 | P4 | ---------- |
|---|---|---|---|---|---|
| ALLOWABLE ERROR | r1 | r2 | r3 | r4 | ---------- |

METHOD FOR COLLATING INDEPENDENT FIGURE ELEMENTS BETWEEN IMAGES

BACKGROUND OF THE INVENTION

1. Field of the Invention

This invention relates to a method for correlating images and, more particularly, is preferable to such applications as differences or changes of an object image are detected with referring to a reference image to recognize or control the object.

2. Description of the Prior Art

An art to perform pattern matching is important in applications which need to identify an object, or to find out, to inspect, to position-control the object and so on. It is one of essential problems in the art of the pattern matching to accurately correct a positional shift and rotational shift of the object image to the reference image.

In the prior art, the center of gravity of an input image and the first-order moment are calculated to detect the positional and rotational shifts for correcting these shifts with referring to the reference image.

According to the prior art, accuracy of correcting the position and rotation is insufficient and is affected by noises mixed in an image signal.

OBJECT AND SUMMARY OF THE INVENTION

In consideration of the above-mentioned problem, it is an object of this invention to detect positional and rotational shifts of the object image to the reference image and to correct the shifts accurately.

It is another object of this invention to accurately collate independent patterns or figure elements in the object image with the reference image.

It is still another object of this invention to detect differences in features of each pattern or element in the object image from the reference image.

It is a further object of the invention to judge quality of the object image with referring to the reference image.

In accordance with an aspect of the present invention, there are provided a method for collating independent figure elements in an object image with a reference image both including elements which are not interlinked with each other, comprising steps of defining a relative coordinate system in an image plane for each of the reference image and the object image on the basis of centers of gravity of two distinctive independent elements which are identified with values indicative of features of the elements; and collating pairs of independent elements between the reference image and the object image on the basis of the relative coordinate system.

An accurate pattern matching is achieved regardless of shifts in position and rotation of the object image from the reference image through definition of a relative coordinate system with referring to two independent elements. The independent elements have characteristic features such as their own area or perimeter. These features are attributes which are not changed by the positional and rotational shifts of the image. The relative coordinate system can be defined without being affected by the shifts of image or noises in the image signal.

The above, and other, object, features and advantages of the present invention, will become readily apparent from the following detailed description thereof which is to be read in connection with the accompanying drawings.

BRIEF DESCRIPTION OF THE DRAWINGS

FIG. 4 is a diagram showing characteristic features of an independent pattern in an image;

FIG. 5 is a diagram showing processing of step S1 in FIG. 1;

FIG. 6 is a diagram showing processing of step S5 in FIG. 1;

DETAILED DESCRIPTION OF A PREFERRED EMBODIMENT

Figure 1:
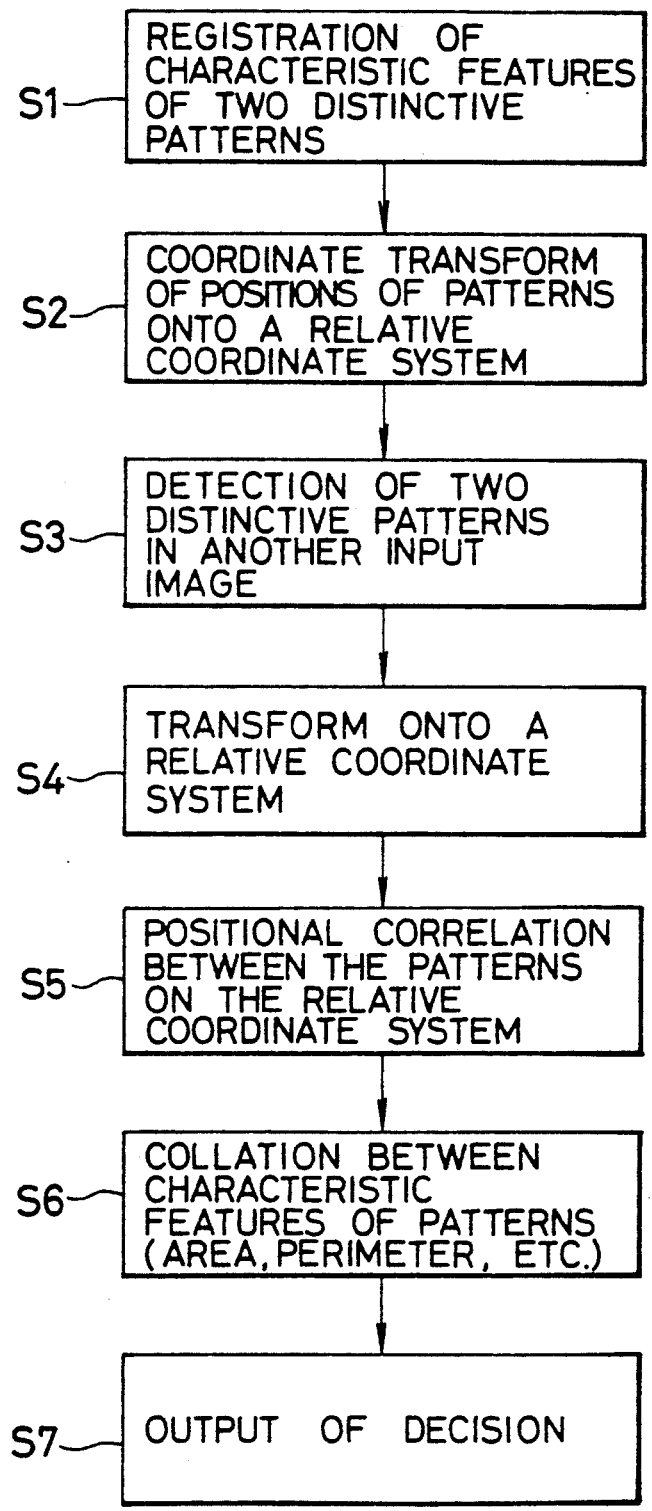
FIG. 1 is a flow chart showing steps of collating images according to this invention.
Figure 2:
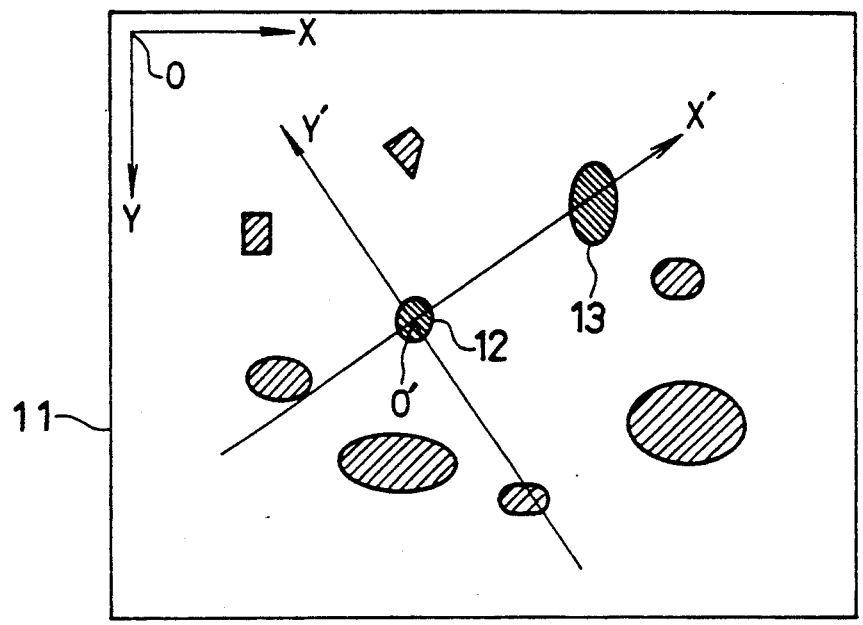
FIG. 2 is a diagram showing a reference image.

FIG. 1 shows a flow chart illustrating steps of a pattern collating process according to this invention. FIG. 2 shows an example of an input image as a reference image and FIG. 3 shows another input image to be collated with reference to the reference image.

The input image of FIG. 2 is supplied from a video camera or a similar device. In a view of the video camera, that is, inside a rectangle area 11, many independent patterns (figure elements or particles) having figures such as an ellipse, trapezoid and so on are involved therein. Each independent pattern (particle) is a set of pixels combined as a unite when an image signal is digitized into pixels with a 64-level resolution for example, and then bipolarized. Mean while, the input image in FIG. 2 to be collated is affected by shifts in position and rotation in a view 21 of the video camera.

Figure 3:
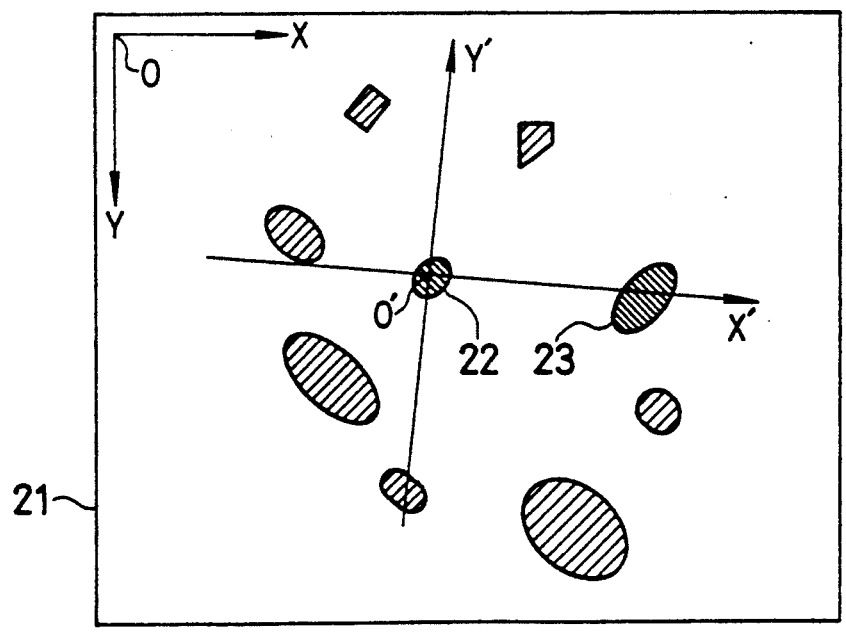
FIG. 3 is a diagram showing an object image.

The images in FIGS. 2 and 3 are correlated in accordance with the steps S1-S7 in FIG. 1. First, in step S1, two distinctive, independent patterns (for example, patterns 12 and 13) are selected in the reference image of FIG. 2. Respective characteristic features of the patterns are registered. Respective positions of the independent patterns in FIG. 2 can be recognized on the X-Y coordinate system. In the X-Y coordinate system, characteristic features of the independent pattern such as the center of gravity, a perimeter, an area, the maximum length, the maximum width (normal to a direction aligned with the maximum length), the maximum width in the vertical direction or the maximum width in the horizontal direction are calculated. The characteristic features to be registered in step S1 may be one or more representatives among these features.

Next, in step S2, coordinate transform is carried out for positional data of all independent patterns of FIG. 2 onto an X'-Y' coordinate system which is defined with the independent pattern 12 as the origin, a line connecting the patterns 12 and 13 as X'-axis and a line normal to the X'-axis as Y'-axis, as shown in FIG. 2. The X'-Y' coordinate is a relative coordinate to the reference X-Y coordinate. The position of the independent pattern is defined by the center of gravity. Positions of the independent patterns are registered with respect to the relative coordinate.

Next, in step S3, another image (FIG. 3) is input. Two independent patterns 22 and 23 corresponding to the patterns 12 and 13 in FIG. 2 are found through correlation of features of new input image with reference to the characteristic features registered in step S1. Identification of the pattern is achieved with referring to the characteristic features such as perimeter, area, maximum length and width among the features shown in FIG. 4 as these features are not affected by shifts in position and rotation of an input image.

Next in step S4, a coordinate transform operation is performed onto a relative coordinate system X'-Y' in the similar manner with step S2. The relative coordinate system X'-Y' is defined on the basis of respective positions of detected patterns 22 and 23. Positions of all independent patterns are then transformed onto the relative coordinate to be registered.

Next, in step S5, positional collation or correlation with respect to the relative coordinate is performed between coordinate data registered in steps S2 and S4 for all of patterns in respective images to find pairs of corresponding patterns. A table is then formed to indicate the pairs of the reference patterns and the object patterns. In next step S6, characteristic features of the pattern are detected to collate (compare) the paired patterns with each other.

In next step S7, a collation result is output as a decision result indicating incompleteness of the image when one of features such as perimeter, area and so on of each object pattern differs from that of the corresponding reference pattern. The decision result indicates quality of the input image to be inspected.

A cluster analysis as illustrated in FIG. 5 may be applied to select two distinctive patterns or elements in the image in step S1 of FIG. 1. For example, different characteristic features $f_1$ and $f_2$ (an area and a perimeter, for example) may be used. These characteristic features are plotted on orthogonal coordinates to determine relatively spaced two patterns (marked with circles in FIG. 5) with removing closely located patterns in the coordinates. Only one characteristic feature may be used to select two patterns or more than two features may be used.

A minimum distance method as shown in FIG. 6 may be applied to correlate paired patterns on the relative coordinate. First, one of independent patterns in the reference image is selected to determine a base point ($X_M$, $Y_M$,) corresponding to the center of gravity, then distances $d_i$ from the base point to all of positions ($X_i$, $Y_i$) of the patterns in the object image (i=1 to N, N: number of patterns in the image) are calculated.

$$d_i = \sqrt{(X_i - X_M)^2 + (Y_i - Y_M)^2}$$

$$i = 1 \text{ to } N$$

The minimum distance $d_{min}$ among the distances $d_1$–$d_N$ is detected to determine a pattern to be paired with the reference pattern located at the base point. This processing is repeated for all patterns in the reference image to collate the patterns between the reference and the object.

Figure 7:
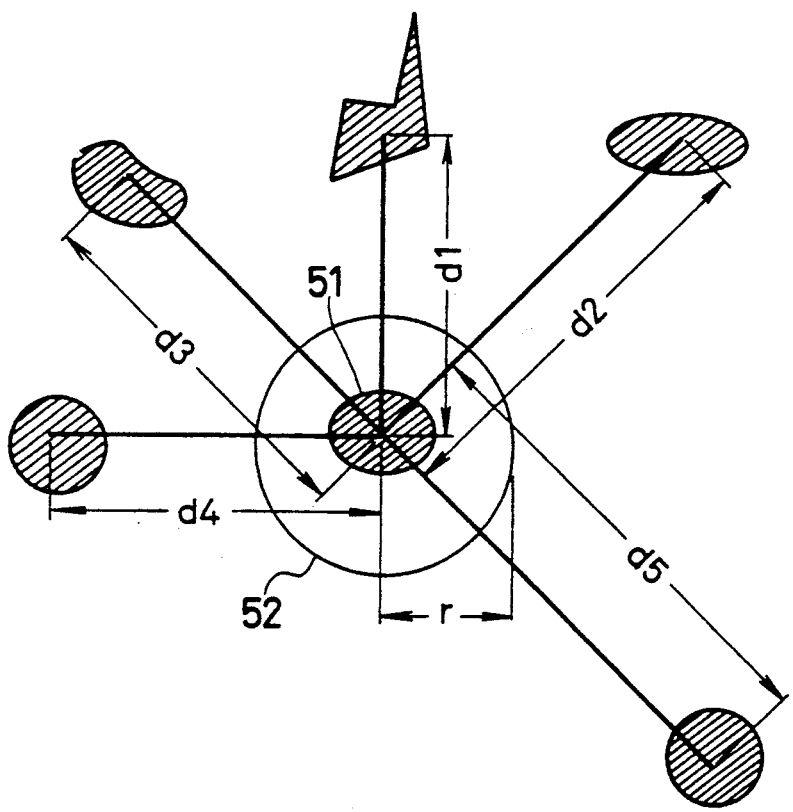
FIG. 7 is a diagram showing processing of positional collation between patterns on the basis of allowable error for decision.
Figures 8, 9:
FIG. 8 is a table indicating independent patterns and allowable errors.
FIG. 9 is a view showing a template for marking on a glass plate, as an example to which the method for collating images of this invention is applied.

Next, a simpler and faster processing to achieve the positional collation process for the patterns than the processing as illustrated in FIG. 6 is explained with referring to FIGS. 7 and 8.

In the process collating positions of the patterns, positions of paired patterns are identical with each other on the relative coordinates of FIGS. 2 and 3. In practice, they are not perfectly identical because of distortion or other influences dependent on a pick-up device for the image. In FIG. 6, the minimum distance must be calculated to make a pair of pattern. This process, however, needs a large number of distance calculations and minimum determination for every input images.

In another process shown by FIG. 7, allowable values r are calculated in advance for collation of patterns. In FIG. 7, the numeral 51 denotes a pattern to which an allowable value is to be set. Distances $d_1$, $d_2$, $d_3$ - - - between their centers of gravity from the pattern 51 to others are calculated to determine the minimum value among the distances. Half of the minimum value is set as an allowable error r.

$$2r = \min (d_1, d_2, d_3 \text{ - - -})$$

The allowable error is set for each independent pattern in the reference image to make a table of allowable errors as in FIG. 8.

As shown in FIG. 7, based on the definition of r, none of center of the gravity of other object patterns never enters in a circle 52 having a radius r from a center of gravity of the reference pattern 51 except a pattern to be paired with the pattern 51.

For performing positional collation between the input object image and the reference image, a distance between the centers of gravity of two patterns is calculated. If the distance is detected to fall in the allowable error indicated on the table of FIG. 8 prepared in connection to the reference image, the two patterns are determined to be paired. Therefore, positional correlation processing is greatly simplified. It is achieved through distance calculation between the patterns and comparing operation with referring to the table which is developed beforehand as in FIG. 8. The correlation processing is completed in a short time for many object images.

FIG. 9 shows an example of an application of this method for collating images. FIG. 9 shows a template for a marking on a glass plate with a sand blasting process. The marking is formed through putting the template having characters and marks such as a manufacturer name and a standard labeling on the glass plate and blasting sand onto the template. Conventionally, the marking formed on the glass is eye-estimated whether it is properly formed without becoming blurred or incomplete. The marking includes a set of independent (not connected) patterns or figure elements so that a method for collating images according to this invention can be applied to an automatic process for inspecting quality of a marking on an object with referring to a reference image.

An automatic inspection apparatus may comprises a video camera, a circuit to digitize an output image of the camera, an image processor (a computer) to execute the steps in FIG. 1 for processing the digitized image. The video camera picks up an image at a position of the marking for each glass plate. Positioning of the glass plate or the video camera may be free from precision. For example, a conveyed glass plate can be positioned with remarkable shifts in position and rotation with respect to a fixed video camera.

As above, the relative coordinate is defined on the basis of two distinctive patterns or elements in the reference and object images according to the image processing steps in FIG. 1 so that shifts in position and rotation between the images is canceled on the relative coordinates. Even though noises are mixed in an input image signal, positional and rotational shifts can be discriminated from the noises and can be canceled through the data processing so as not to affect the succeeding pattern matching processing for a quality determination of marking.

According to this invention as above-mentioned, relative coordinates are defined on the basis of positions of two independent patterns in an image and collation of patterns are carried out on relative coordinates of images. Since characteristic features such as a perimeter or an area of each independent pattern are never influenced by positional and rotational shifts of an input image, a data processing for a pattern matching is performed with an accurate registration between the reference and object images on the basis of the coordinate system.

What is claimed is:

1. A method for correlating independent pattern elements in an object image with a reference image both images including elements which are not interlinked with each other, the elements of each image having a fixed positional relationship to one another, comprising steps of:
   plotting said elements on orthogonal coordinates and plotting values indicative of features of each element on orthogonal feature coordinates;
   selecting two distinctive independent elements in the reference image based on values indicative of features of each element plotted on said orthogonal feature coordinates;
   identifying the two distinctive independent elements in the object image based on the values indicative of features of the selected elements;
   defining a relative coordinate system in an image plane for each of the reference image and the object image such that a predetermined coordinate of each of the two distinctive independent elements are used to establish one axis of the relative coordinate system;
   plotting the elements of each image on the relative coordinate system such that the positional relationships between the elements of each image are not altered; and
   correlating pairs of independent elements between the reference image and the object image on the basis of the relative coordinate system.

2. A method according to claim 1, wherein said relative coordinate system is defined with an axis passing through both predetermined coordinates of the distinguished two elements and an orthogonal axis passing through the predetermined coordinate of one of two elements.

3. A method according to claim 1, wherein said features used to identify the distinctive elements of the object image are values of the area and the perimeter of the independent elements.

4. A method according to claim 1, wherein distances from one element of the reference image to each element of the object image are calculated by reference to coordinates indicative of positions of the elements, a minimum distance is found to determine correspondence of one of the elements of the object image with one element of the reference image, and repeating the process to correlate all of the independent elements within both images.

5. A method according to claim 1, wherein the reference image and the object image are digitized on X-Y coordinate system and then converted onto the relative coordinate system.

6. A method according to claim 1, wherein the features of the elements so correlated are compared to perform pattern matching.

7. A method according to claim 1, wherein a distance is calculated from each independent pattern element to the nearest independent pattern element within the reference image, an allowable range smaller than the distance is set so as to correspond to each independent pattern element, and each pattern element in the object image is detected to be located within the allowable range, for pairing elements in the object image with the elements in the reference image.

8. A method for correlating an object image with a reference image both including independent figure elements which are not interlinked with each other, the independent elements having a fixed positional relationship to one another, comprising the steps of:
   plotting said elements on orthogonal coordinates and plotting features of figure of each element on orthogonal feature coordinates;
   selecting two elements which are distinguished from other elements in the reference image based on features of figure plotted on said orthogonal feature coordinates;
   identifying a predetermined coordinate for each of the selected elements;
   defining a relative coordinate system with an axis passing through both of the predetermined coordinates and an orthogonal axis passing through one of the predetermined coordinates and then converting the predetermined coordinate of each selected element in the reference image onto the relative coordinate system;
   selecting from the object image two elements having substantially identical features with those of the selected elements in the reference image, identifying a predetermined coordinate for each of the selected elements, plotting the selected elements on the relative coordinate system so that an axis passes through both if the identified predetermined coordinates and a normal axis passes through one of the identified predetermined coordinates, and then converting the predetermined coordinate of each element in the object image onto the relative coordinate system without altering the positional relationship between the elements;
   comparing the predetermined coordinates of respective elements in the object image with those of elements in the reference image on the relative coordinate system to prepare a list of paired elements between the object image and the reference image; and
   correlating features of figure between said paired elements to discriminate an object element different from the corresponding reference element in the feature of figure.

9. A method according to claim 8, wherein said step for preparing a list of paired elements comprising steps of:
   calculating a distance from each independent pattern element to the nearest independent pattern element within the reference image with respect to the predetermined coordinates thereof, setting an allowable range smaller than the distance so as to correspond to each independent pattern element, and calculating a distance from each pattern element in the reference image to each pattern element in the object image with respect to the predetermined coordinates thereof and pairing these element when the distance is smaller than the allowable range.

10. A method according to claim 8, wherein said features of figure to distinguish the element are attributes which are not affected by positional and rotational shifts of the image.

11. A method according to claim 10, wherein said features of figure are values of the area and the perimeter of the figure elements.

12. A method for collating independent pattern elements in an object image with a reference image, both the reference and object images having pattern elements which are not interlinked with each other, the method comprising the steps of:

selecting two distinctive independent elements in the reference image based on values indicative of features of each element plotted on orthogonal coordinates;

defining a relative coordinate system in an image plane for each of the reference image and the object image such that the centers of gravity of the two distinctive independent elements are used to establish one axis of the relative coordinate system, the two distinctive elements in the object image being identified by the features of the independent elements indicative of the area and the perimeter of the independent elements; and collating pairs of independent elements of the reference image and the object image on the basis of the relative coordinate system.

13. A method of collating independent pattern elements in an object image with independent pattern elements reference image, both including elements which are not interlinked with each other, the method comprising the steps of:

selecting two distinctive independent elements in the reference image based on values indicative of features of each element plotted on orthogonal coordinates;

defining a relative coordinate system in an image plane for each of the reference image and the object image such that the centers of gravity of the two distinctive independent elements are used to establish one axis of the relative coordinate system, the two distinctive elements in the object image being identified with values indicative of features of the elements;

collating pairs of independent elements of the reference image and the object image on the basis of the relative coordinate system; and wherein a distance is calculated from each independent pattern element to the nearest independent pattern element within the reference image, an allowable range smaller than the distance is set so as to correspond to each independent pattern element, and each pattern element in the object image is detected to be located within the allowable range thereby pairing the independent elements in the object image with the independent elements in the reference image.

14. A method for collating an object image with a reference image both including independent figure elements which are not interlinked with each other, comprising the steps of:

selecting two elements which are distinguished from other elements in the reference image to have at least one distinctive feature of figure plotted on orthogonal coordinates;

identifying a coordinate indicative of the predetermined coordinate for each of the selected elements;

defining a relative coordinate system with an axis passing through both of the predetermined coordinates and an orthogonal axis passing through one of the predetermined coordinates and then converting the coordinate indicative of the predetermined coordinate of each selected element in the reference image onto the relative coordinate system;

selecting from the object image two elements having identical features with those of the selected elements in the reference image, identifying a coordinate indicative of the predetermined coordinate for each of the selected elements, defining a relative coordinate system with an axis passing through both of the identified coordinates and a normal axis passing through one of the identified coordinates, and then converting the coordinate indicative of the predetermined coordinate of each selected element in the object image onto the relative coordinate system;

comparing coordinates of respective centers of gravity of elements in the object image with those of elements in the reference image on the relative coordinate system to prepare a list of paired elements between the object image and the reference image;

collating features of figure between said paired elements to discriminate an object element different from the corresponding reference element in the feature of figure; and preparing a list of said paired elements by calculating a distance from each independent pattern element to the nearest independent pattern element within the reference image with respect to the centers of gravity thereof, setting an allowable range smaller than the distance so as to correspond to each independent pattern element, and calculating a distance rom each pattern element in the reference image to each pattern element in the object image with respect to the centers of gravity thereof and pairing these elements when the distance is smaller than the allowable range.

15. A method according to claim 14, wherein said list of said paired elements includes;

distances calculated from one element in the reference image to each of the elements in the object image by reference to coordinates indicative of centers of gravity of the elements, and minimum distances each between the one element in said reference image and one of the elements in the object image upon repeating the process to collate all of the independent elements within both images.

16. A method for collating an object image with a reference image both including independent figure elements which are not interlinked with each other, comprising the steps of:

selecting two elements which are distinguished from other elements in the reference image to have at least one distinctive feature of figure plotted on orthogonal coordinates;

identifying a coordinate indicative of the predetermined coordinate for each of the selected elements;

defining a relative coordinate system with an axis passing through both of the predetermined coordinates and an orthogonal axis passing through one of the predetermined coordinates and then converting the coordinate indicative of the predetermined coordinate of each selected element in the reference image onto the relative coordinate system;

selecting from the object image two elements having substantially identical features with those of the selected elements in the reference image, identifying a coordinate indicative of the predetermined coordinate for each of the selected elements, defining a relative coordinate system with an axis passing through both of the identified coordinates and a normal axis passing through one of the identified coordinates, and then converting the coordinate indicative of the predetermined coordinate of each selected element in the object image onto the relative coordinate system;

comparing coordinates of respective centers of gravity of elements in the object image with those of elements in the reference image on the relative coordinate system to prepare a list of paired elements between the object image and the reference image; and collating features of figure between said paired elements to discriminate an object element different from the corresponding reference element in the feature of figure, said features of figure to distinguish the element being attributes which are not affected by positional and rotational shifts of the image, and being values of the area and the perimeter of the figure elements.

17. The method of claim 1, wherein the predetermined coordinate of the independent element is indicative of the center of gravity of the independent element.

18. The method of claim 8, wherein the predetermined coordinate of the independent element is indicative of the center of gravity of the independent element.

* * * * *